Dec. 11, 1951  J. EVANOFF ET AL  2,578,052
LOAD SUSPENDING VEHICLE BODY
Filed Nov. 25, 1946  2 SHEETS—SHEET 1
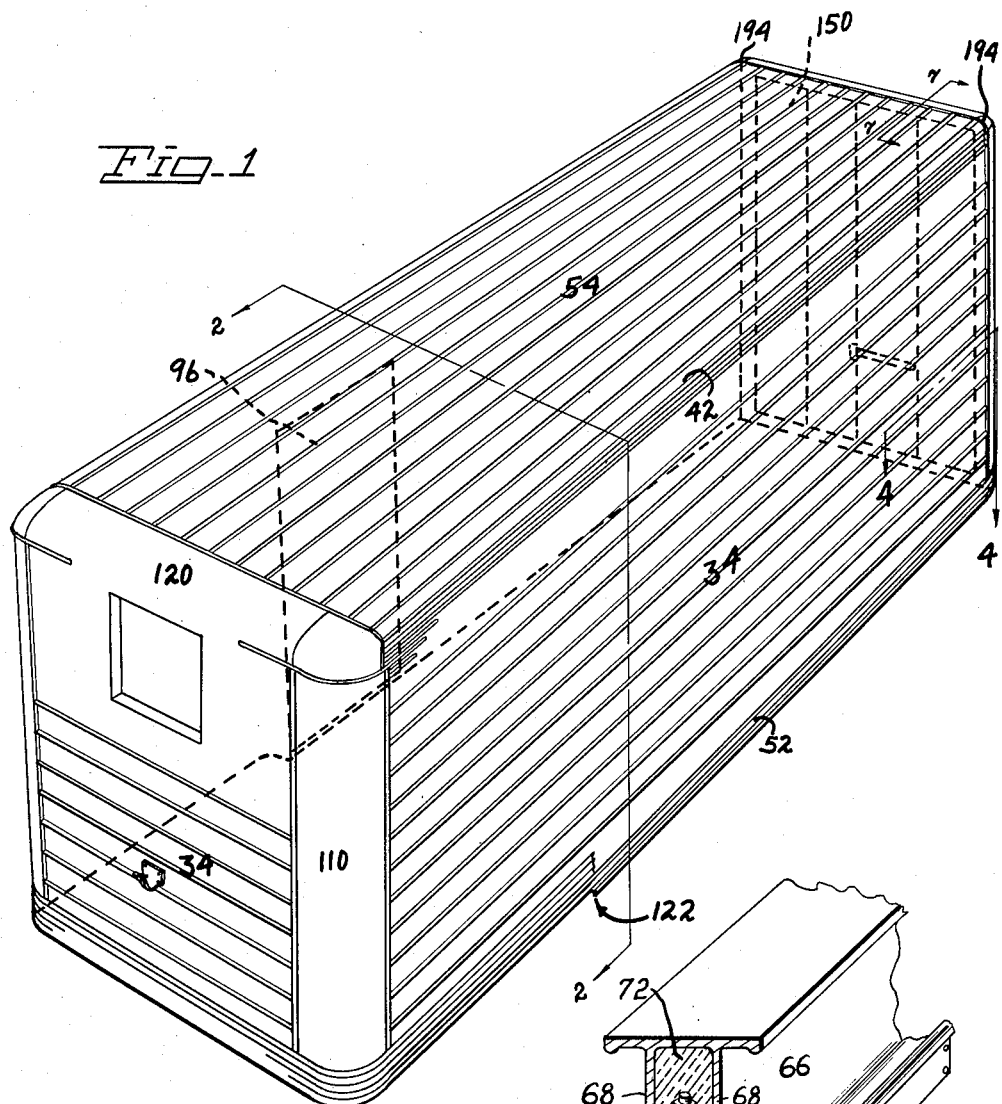
INVENTORS
JOHN EVANOFF
BY HARRY L. CASTINO
Glenn L. Fisk
ATTORNEY

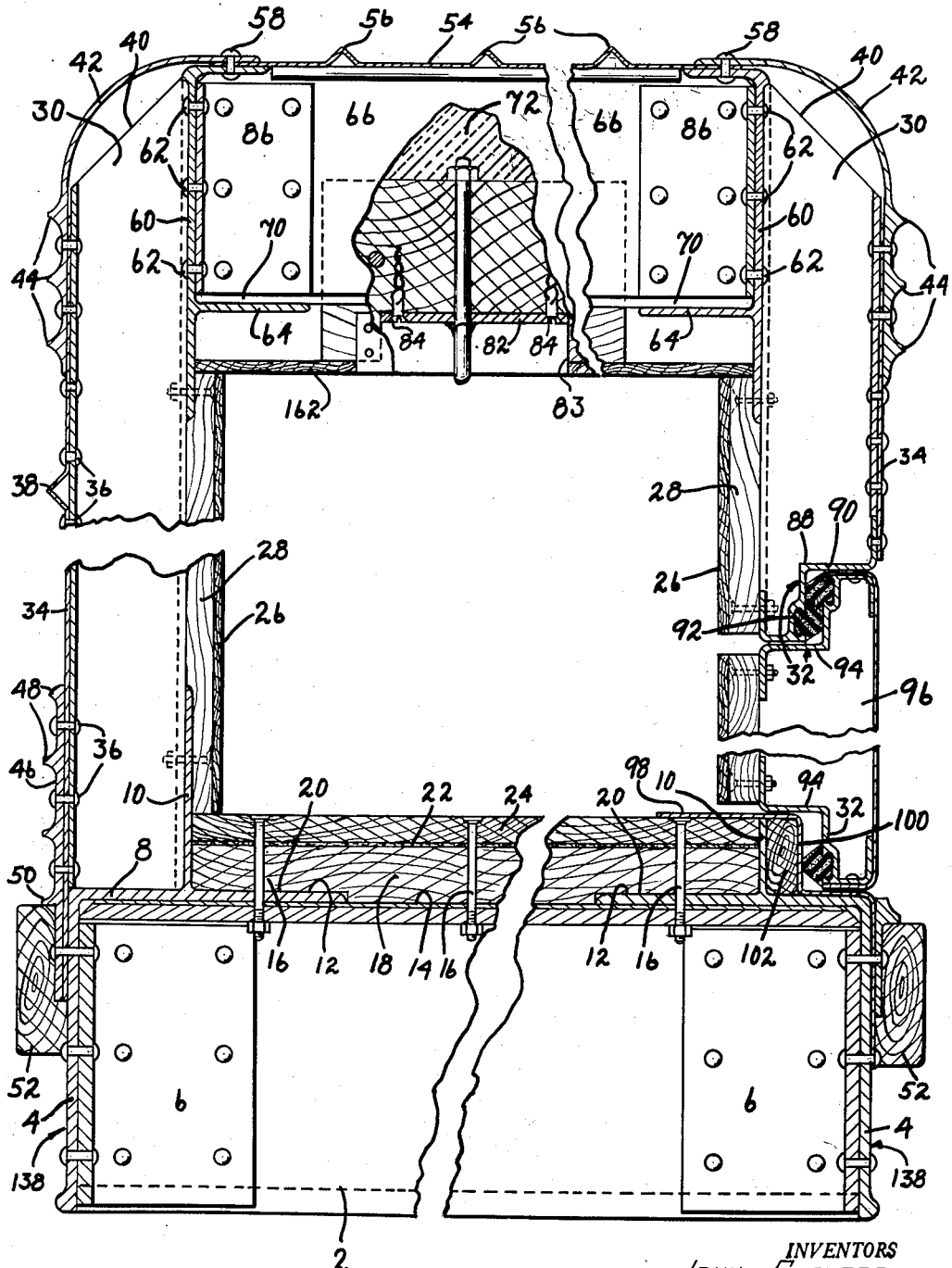

Patented Dec. 11, 1951

2,578,052

UNITED STATES PATENT OFFICE 2,578,052

LOAD SUSPENDING VEHICLE BODY

John Evanoff and Harry L. Castino, Dishman, Wash., assignors of one-fourth to Abner M. Ingebretson, Dishman, Wash.

Application November 25, 1946, Serial No. 712,208

2 Claims. (Cl. 296—28)

Our present invention relates to improvements in load suspending vehicle bodies and more particularly to bodies constructed from a combination of special and standard shapes of aluminum alloy extrusions, gussets, and corrugated aluminum alloy sheet to form a vehicle body structurally strong within itself which can be used as a truck body, a semi-trailer either of frameless construction or on a semi-trailer chassis, or a full trailer either of frameless construction or on a full trailer chassis.

It is the primary object of our invention to provide a vehicle body to be constructed for whatever special uses it may be built and to obtain the maximum amount of strength from the vehicle body with a minimum of unproductive weight.

Another object of our invention is to utilize the maximum amount of strength from the material used in the construction of the vehicle body by riveting the side and roof panels to the frame forming a unitary vehicle body and to build a vehicle body and use it as a truck body, trailer body, or semi-trailer body and build the vehicle body to whatever length, height, and width required and to permit the inside finish required and to be able to use the same vehicle body construction.

The vehicle body of our invention will withstand a maximum amount of impact with a minimum amount of damage to the vehicle body in case of a wreck and a minimum amount of damage to the load, while using steel formed sections only where the physical properties of aluminum alloys are not high enough to withstand the weight or impact.

We have found it desirable to make the strength of our vehicle body flexible. This is governed by the amount of floor cross members, side posts, and roof bows used forming box sections of the width necessary to withstand the loads carried, whether the loads carried are suspended from the roof; from loose loads carried on the floor; or heavy compact loads carried on the floor.

In the accompanying drawings we have illustrated one complete example of the physical embodiment of our invention according to the best mode we have thus far devised, but it will be understood that various changes and alterations may be made in the exemplified structure within the scope of the appended claims.

In the drawings:

Fig. 1 is a view in perspective of a truck body or trailer body.

Fig. 2 is a sectional view taken on line 2—2 of Fig. 1 broken in sections to permit enlargement of parts for purpose of illustration.

Fig. 3 is a sectional view of the roof stringer showing an eye bolt insulated from the metal to prevent heat and cold being transferred in and out of the truck body.

Referring now to the drawings wherein we have illustrated our present preferred form of the invention we employ floor sills 2 extending across the underside of the floor of the truck or trailer body and secured to the longitudinal side members 4 by angle plates 6. Upwardly the side members are formed with horizontal sections 8 from which are centrally arranged and vertically extended the wall-plates 10, the inner edge portion or ledge 12 of the sections 8 being a support for the floor of the body. These side members 4 and horizontal sections 8 form angle plates or angular girders, one located at and extending longitudinally of each side of the vehicle body, which, together with the longitudinally spaced and transversely disposed cut-away I-sills 2, form a floor supporting frame. The extruded upright wall-plates 10 of the flanged girders form bases for the inner body walls of the vehicle, and the outer skin or housing of the body is supported on the girders.

The floor consists of the thin metal sheet or skin 14 secured by bolts 16 beneath the portions 12 against furring strips 18 which are recessed at 20 to fit the portions 12. Above the strips is a layer of moisture-proof paper 22, the insulation material 19, and the wood 24 being laid thereon and secured by the bolts 16.

The composite floor is thus fitted between the laterally spaced parallel base-plates 10 of the two girders beneath the inner wall of the body of the vehicle, and the tie-down bolts 16 passed through the floor and the upper flanges of the transverse sills 2 are secured by usual clamp nuts, to install the floor as a component part of the vehicle body.

The inner walls are built up and include the surface covering 26 on furring strips 28 which are attached to the Z-posts 30 spaced along the body and to which is secured the exterior skin 34 by rivets 36, and the skin is corrugated at 38 to give stiffness and support thereto.

The horizontal plates and flanges 8 of the girders provide a substantial base for the longitudinally spaced upright Z-posts at opposite sides of the body; the inner flanges of the posts at their lower ends are fastened by wall-bolts to the base walls or plates 10; and similar bolts fasten the inner body-wall to the inner flanges of the posts. The outer skin or housing 34, which is riveted to the outer flanges of the posts, is thus spaced from the inner wall to receive insulation material.

The upper edges of the inner wall and the outer housing, at opposite sides of the body are united by longitudinally extending panels, and the posts 30 at their upper ends are angularly cut at 40 to support the rounded corners 42 of these panels, which panels have extruded flanges seated on the tops of the cut-away posts. These rounded corners merge with ribbed side plates 44 of the panels, and the rivets 36 fasten these plates to the outer flanges of the Z-posts.

At the floor level two lower exterior longitudinally extending panels 46, each having reinforcing and ornamental ribs 48, are riveted through the housing, to the outer flanges of the Z-posts and to the girders 8, and longitudinal shoulders 50 of these panels engage the usual wooden rub-rail 52, one located at each side of the vehicle.

A roof skin or outer sheathing 54 is ribbed at 56 for stiffness and is secured under the covers 42 by rivets 58. Vertical plates in the form of longitudinally extending stringers 60 are mounted on the Z-posts 30 by rivets 62 and to the covers 42 by rivets 58. A lateral flange shelf 64 on these plates aids in supporting the roof truss which comprises beams 66 having spaced depending legs 68 and shoulders 70. Insulation 72 is positioned in the recess or pocket between the legs 68 and timbers 74 secured by bolts 76, support bolts 78 and rings 80 from which rings, freight load may be carried in transit. Bearing plates 82 cover the under side of notches 83 of the timbers 74 and are secured by screws 84. Angle plates 86 brace and support the roof trusses against the vertical plates or stringers 60.

The longitudinally spaced and transversely arranged roof trusses forming over-head load-supporting or load-suspending beams, which unite the two longitudinally extending stringers 60, 60, afford a stable support for the timbers 74 that are fastened by bolts 76 between the two legs or webs of the transverse beams.

In many forms of truck or trailer bodies it is desirable to provide a door in the side of the body and to meet that requirement we aperture the side wall by cutting the Z-posts 30 at 88 to receive the offset portion 90 of the extruded member 32 stepped to fit the rubber molding 92 against which the offset 94 of the door 96 will fit. A steel threshold 98 is offset at 100 to cover the floor structure including a filler block 102 and is secured in the wall structure between the plate 4 and rub rail 52.

From the above description it will be apparent that we have devised a novel and unique structure for truck and trailer bodies which will be relatively light in weight yet strong and durable, and which lends itself easily to insulation for refrigeration to transport such items as fresh meats and the like.

Having thus fully described our invention what we claim as new and desire to secure by Letters Patent is:

1. In load-suspending means forming part of a vehicle body-frame, the combination with a base frame, and two rows of longitudinally spaced Z-posts rigid therewith, of a longitudinal stringer uniting the upper ends of each row of posts, a lower horizontal shelf integral with each stringer, longitudinally spaced I-beams each having two spaced webs and mounted on the two shelves, angle plates riveted at their ends to the two stringers and to the spaced webs, a timber mounted within and bolted to the webs of the beams, and a suspending eye-bolt mounted in the timber.

2. In a vehicle body having a base frame and side walls supported on said frame, load suspending beams adapted to be mounted upon and supported by said walls, each said beam having spaced depending webs, an inverted T-shaped timber mounted between said webs, transversely extending bolts passing through said webs and timber for securing the timber therein, support bolts extending vertically through said timbers, and eyes on the lower end of said support bolts.

JOHN EVANOFF.
HARRY L. CASTINO.

REFERENCES CITED

The following references are of record in the file of this patent:

UNITED STATES PATENTS

| Number | Name | Date |
|---|---|---|
| 776,623 | Smith | Dec. 6, 1904 |
| 916,324 | Kastendike | Mar. 23, 1909 |
| 1,220,193 | Christianson | Mar. 27, 1917 |
| 1,293,708 | Christianson | Feb. 11, 1919 |
| 1,675,701 | Fitch | July 3, 1928 |
| 1,910,397 | Lewis | May 23, 1933 |
| 2,007,295 | Coble | July 9, 1935 |
| 2,047,503 | Wilson et al. | July 14, 1936 |
| 2,050,425 | Dean | Aug. 11, 1936 |
| 2,100,323 | Fitch | Nov. 30, 1937 |
| 2,172,571 | Theriault | Sept. 12, 1939 |
| 2,222,335 | Dietrich | Nov. 19, 1940 |
| 2,263,510 | Lindsay | Nov. 18, 1941 |
| 2,363,170 | Fontaine | Nov. 21, 1944 |
| 2,400,253 | Ostlund | May 14, 1946 |
| 2,428,144 | Clough | Sept. 30, 1947 |
| 2,471,917 | Wilson | May 31, 1949 |
| 2,504,657 | Dean | Apr. 18, 1950 |
| 2,504,659 | Dean | Apr. 18, 1950 |

OTHER REFERENCES

"Meyer Refrigerated Meat Body," page 24, "Autobody" of Jan. 1929.